Dec. 3, 1963 W. E. SWARTZ ETAL 3,112,761
DETACHABLE ACTUATOR FOR VALVES
Filed March 8, 1961

INVENTORS
WILLIAM E. SWARTZ
WILLIAM L. KRAYER
BY
William L. Krayer
ATTORNEY

United States Patent Office 3,112,761
Patented Dec. 3, 1963

3,112,761
DETACHABLE ACTUATOR FOR VALVES
William E. Swartz, McKeesport, and William L. Krayer, Mount Lebanon, Pa., assignors to Calgon Corporation, a corporation of Pennsylvania
Filed Mar. 8, 1961, Ser. No. 94,284
4 Claims. (Cl. 137—382.5)

This invention relates to apparatus for establishing pneumatic set points of predetermined value. More particularly, it relates to a pneumatic set point station capable of generating a series of pneumatic pressure signals of predetermined values and ratios and which may quickly and easily be reset to generate a different series of pneumatic pressure signals of different predetermined values and ratios.

In a weighing or mixing operation such as the mixing of concrete, cement, chemicals, and the like for delivery to a concrete mixer or chemical reactor of one kind or another, it is often the case that the same or similar ingredients must be mixed in various proportions. Frequently, as in the case of concrete, for example, the ingredients are mixed, or "batched" in several commonly used proportions. It is the present practice in the trade, where there is no automatic batching system, to repeatedly calculate and measure the amount of each ingredient needed, even though the same proportions are called for a number of times in a day's or week's operations.

An object of this invention is to provide an apparatus which will deliver a pneumatic pressure signal which is determined by the length or other characteristic of a key associated with the result desired. It is a further object of this invention to provide a new means for automatic batching. Our invention is applicable to any operation requiring a series of pneumatic signals of predetermined values and ratios. Other objects will appear in the description which follows.

Our invention is an apparatus which will generate one or more pneumatic pressure signals of predetermined value or ratio which may be used to provide end points for weighing apparatus or the like, bias or set points, or to operate valves, hoppers, or the like to deliver ingredients of a mixture in known values or ratios as functions of the pneumatic signals, or to perform any other function where a series of pneumatic signals is needed in predetermined ratios.

For convenience of discussion, the description of the operation of our invention will be restricted to concrete batching. It is to be distinctly understood, however, that it is equally applicable to any operation requiring a number of pneumatic pressure signals of predetermined values or ratios.

In the mixing of concrete, various uses for the concrete require various proportions of the ingredients. In a large scale operation, a mobile concrete mixer is positioned under a hopper, chute, or the like, the ingredients are added, and the mixer moves out to permit another mixer to enter. The point of delivery may be for one or several ingredients. Our invention is applicable in either case. For a detailed explanation of two variations of our invention, reference is made to the drawings.

Operation of the invention will be described along with the physical description.

Figure 1:
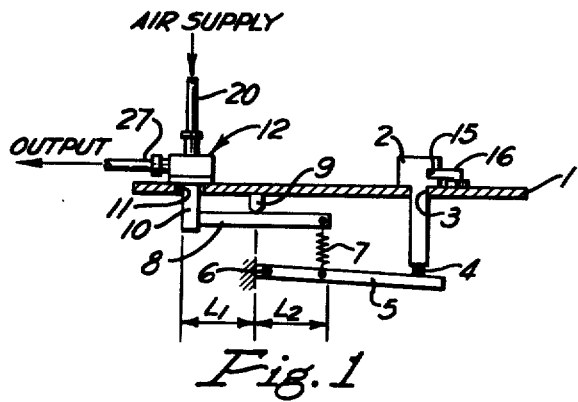
FIGURE 1 is a more or less diagrammatic side elevational view of one signal-generating unit.
Figure 4:
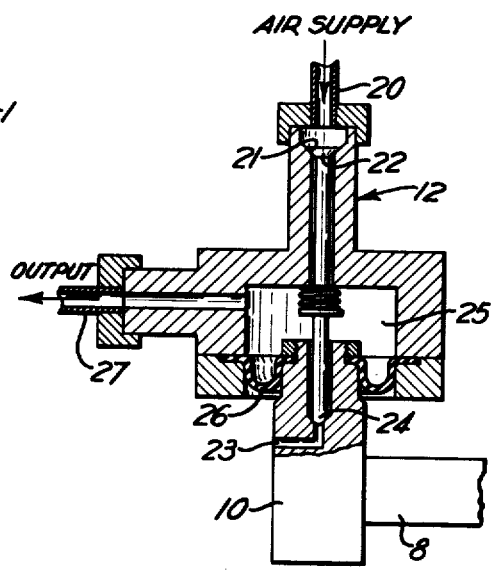
FIG. 4 is a side elevational section of the preferred pneumatic diaphragm signal-generating chamber and housing therefor.

Referring now to FIG. 1, base 1 extends the length of the signal-generating unit illustrated. Key 2 passes through slot 3 in base 1. Key 2 may be locked in place by sliding lug 16 inserted into orifice 15. Fine adjustment screw 4 on key 2 makes contact with lever 5 mounted on fixed pivot 6, moving lever 5 in a clockwise direction. Coiled spring 7 is stretched by the downward motion of lever 5, thus exerting a clockwise force on beam 8, to which it is attached. Beam 8 is mounted on fixed fulcrum 9, which is preferably fixed to base 1. The side of the beam opposite to that on which the spring 7 is attached holds a head 10 which passes freely through slot 11 of base 1 to diaphragm chamber 12 having an air supply receiving means and an output transmitting means. The details of the construction of device 12 are shown in FIG. 4. For convenience of discussion the arms on each side of the fulcrum 9 on beam 8 may be referred to as $L_1$ and $L_2$. Preferably the arms will be equal.

Figure 2:
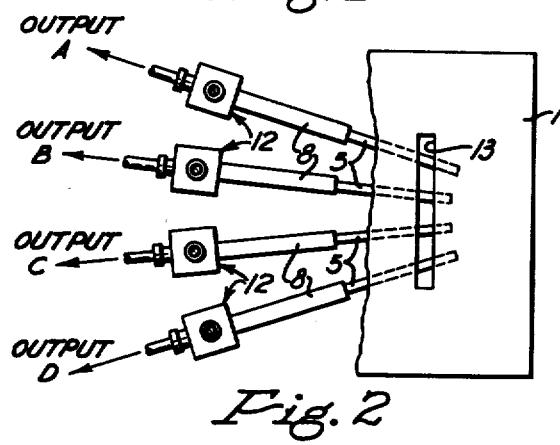
FIG. 2 is a more or less diagrammatic overhead view of a signal-generating station having four units.

FIG. 2 is an overhead view of a plurality of the units of FIG. 1, grouped to accommodate a single key. Base 1 has been broken away to expose levers 5 and beams 8. Slot 13 is in this case long enough to accommodate a key having four elongated members or extensions. The free ends of levers 5 are spaced and located preferably directly below slot 13 to make contact with a key inserted through it.

Figure 3:
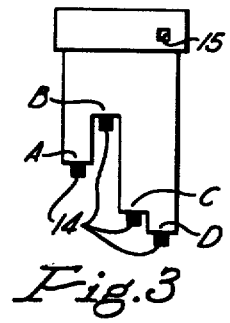
FIG. 3 is a key which may be used to set the desired proportion of ingredients in the four-unit station of FIG. 2.

FIG. 3 illustrates a presently preferred form of key having four extensions A, B, C, and D. Each has a fine adjustment screw 14 which may effectively lengthen or shorten its respective extension. Orifice 15 is shaped to accommodate a sliding lug or bar 16 for holding the key in place. Different keys may be made to suit different operations.

FIG. 4 is a side elevational section of chamber 12. This device in combination with beam 8 is fully described in Bulletin MSP-120 of the manufacturer, Hagan Chemicals & Controls, Inc. A regulated air supply, generally at 60 p.s.i., enters tube 20 and is normally entirely blocked at inlet port 21 by poppet pilot valve 22. When beam 8 is forced slightly upward, however, exhaust port 23 is closed by end 24 of the valve stem and poppet valve 22 moves upward to open the inlet port 21. Air entering chamber 25 through the open inlet port exerts a pressure on diaphragm 26 tending to force beam 8 downward and opening the exhaust port 23. A balance is reached at the point where the downward air pressure in chamber 25 is equal to the upward force exerted on diaphragm 26 by beam 8. The air pressure thus generated in chamber 25 is transmitted through output port 27 to be used in controllers, valves, meters, or other instruments as a bias signal, operating signal, or the like.

Thus, it may be observed that in the embodiment illustrated in FIGS. 1 through 4, signal D has the highest value, signal C a slightly smaller value, signal A considerably smaller, and signal B will have the smallest value. The various output pressures may be used in a known manner to deliver proportional quantities of material to a desired site. Or, the signals may be used as negative bias and thus result in inversely proportional or reciprocal quantities of ingredients. They may be used to start and stop the flow of material in relation to time, weight, flow rate, or any other factor which is convenient under the circumstances.

Figure 5:
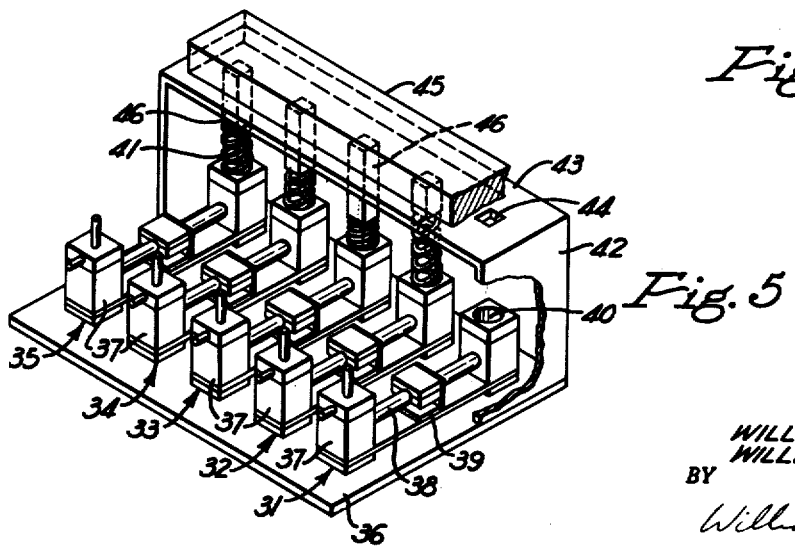
FIG. 5 is a preferred variation of our invention in which the key applies a force directly to the beam without the use of a lever.

FIG. 5 illustrates a five-point station constructed in a different manner in that the levers are not employed. Ratio relays 31, 32, 33, 34, and 35 are mounted on platform 36 in any suitable adjacent manner. Each has a pneumatic signal generating chamber 37 as previously described in FIG. 4. Each has a movable beam 38 mounted on fulcrum 39. The rear end of beam 38 is equipped with channel 40 for receiving spring 41 and directing its force to the end of beam 38. Support 42 elevates base 43 to its position over the spring ends of the ratio totalizers. Base 43 is provided with slots 44 corresponding to each spring location. Key 45 having extensions 46 of the desired lengths is inserted into the slots, thus compressing the springs. Chambers 37 generate pneumatic pressure signals proportional to the forces exerted on the other end of their respective beams by the springs as previously described.

A variation of the embodiment of FIG. 5 employs a series of pressure signal generators as in FIG. 4 mounted in the inverted position directly under a key 46 and spring device 41 as shown in FIG. 5. In other words, a compressed spring force is applied directly to head 10. This eliminates the need for a fulcrumed beam; however, it is not as readily adjusted.

Many variations in the illustrated presently preferred embodiments may be employed within the scope of our invention. For example, base 1 need not exist as illustrated. We need only a rigid support of any kind for key 2. Fixed pivot 6 may be mounted on any stationary body. Likewise, fulcrum 9 need not be mounted on base 1. Indeed, the ratio totalizer described in the previously mentioned bulletin of Hagan Chemicals & Controls, Inc. is particularly suited for use in this invention. In this device, the fulcrum is mounted on a support which may be anchored to any base or other support. Thus, our invention may include any stationary support for the fulcrum 9, fixed pivot 6, and key 2.

Key 2, shown in detail in FIG. 3, may be of any shape so long as there is a stationary support for it which enables extensions A–D to make contact with levers 5 to exert a force proportional to their lengths. For example, the key shown in FIG. 3 may be mounted on a pivot as a cam, and simply turned to be locked into place. Of course, any number of extensions may be employed. The key employed in FIG. 5 is a variation from that of FIG. 3 in that the extensions are not made from a single solid body. A set of removable key extensions of a shape similar to those of FIG. 5 may be made to be adapted to a key holder to be used and removed on any desired combination.

Lever 5 may be pivoted between the key and the spring as well as at the end. It may be attached to spring 7 to provide tension, as in FIG. 1, or compression of the spring as is used in FIG. 5. Where compression of the spring, rather than tension, exerts a force on a beam such as beam 8 in FIG. 1, chamber 12 should be located on the underside of the beam.

Fulcrum 39 in FIG. 5 is adjustable. In the ratio totalizer used, the arm ratios $L_1/L_2$ may vary from about 4.5:1 to about 1:4.5. Use of this adjustment enables a wide range of spring strengths to be used and permits ratio adjustments for variations not used often enough to justify making a special key.

Other means for generating a pneumatic signal proportional to a force are, of course, known in the art. The device illustrated as chamber 12 (FIG. 4) may be replaced by any such unit. Although we prefer a diaphragm device having a poppet valve as described, we mean to include in the scope of our invention any device capable of generating a pneumatic signal proportional to a force acting upon it.

Other variations and modifications may occur to those skilled in the art to which this invention pertains. It is to be distinctly understood that the presently preferred embodiments illustrated and described may be otherwise constructed within the scope of the following claims.

We claim:

1. A pneumatic signal generating station comprising:
(A) a plurality of pneumatic signal generating units, each comprising:
   (1) a pneumatic pressure device for generating a pneumatic pressure signal proportional to a mechanical force acting upon it,
   (2) a normally uncompressed coil spring in contact with said pneumatic pressure device for applying a mechanical force to it, and
(B) a base adapted to receive a key comprising a plurality of extensions, whereby when a key is inserted, said springs are compressed to cause said pneumatic pressure devices to generate pneumatic pressure signals proportional to their respective compressions.

2. Apparatus for simultaneously providing a series of pneumatic signals of predetermined ratios comprising:
(A) a plurality of pneumatic pressure generating units, each comprising a beam mounted on a fulcrum and having arms $L_1$ and $L_2$, a rigid member mounted on a fixed pivot and having means for contacting a key, a spring connecting one arm of said beam and said rigid member such that when said rigid member is pivoted, a force is exerted on said beam, and means located on said beam for generating a pneumatic pressure proportional to the force exerted on said beam by said spring;
(B) a base having means for accommodating a key located in spaced relation to the said means on said rigid members for contacting a key; and
(C) a key comprising a body and a plurality of extremities of predetermined length relation for contacting said rigid member.

3. A pneumatic signal generating station comprising:
(a) a plurality of signal generating units, each comprising means for generating a pneumatic pressure signal proportional to a force action upon it;
(b) a base adapted to receive a key having a plurality of extensions; and
(c) means adapted to exert forces proportional to the lengths of said extensions on said signal generating units.

4. The combination comprising
(a) the signal generating station of claim 3, and
(b) a key having a plurality of extensions, said key adapted to be received by said signal generating station to cause it to generate pneumatic signals proportional to the lengths of said extensions.

References Cited in the file of this patent
UNITED STATES PATENTS

| | | |
|---|---|---|
| 423,462 | Whittingham | Mar. 18, 1890 |
| 1,234,643 | Doyle | July 24, 1917 |
| 1,788,586 | Oweger | Jan. 13, 1931 |
| 2,505,887 | Edison | May 2, 1950 |
| 2,511,923 | Larsen | June 20, 1950 |
| 2,805,552 | Hudson | Sept. 10, 1957 |
| 2,979,073 | Edison | Apr. 11, 1961 |

UNITED STATES PATENT OFFICE
CERTIFICATE OF CORRECTION

Patent No. 3,112,761　　　　　　　　　　　December 3, 1963

William E. Swartz et al.

It is hereby certified that error appears in the above numbered patent requiring correction and that the said Letters Patent should read as corrected below.

In the sheet of drawings, and in the heading to the printed specification, title of invention, for "DETACHABLE ACTUATOR FOR VALVES", each occurrence, read -- APPARATUS FOR ESTABLISHING PNEUMATIC SET POINTS OF PREDETERMINED VALUE --.

Signed and sealed this 28th day of April 1964.

(SEAL)
Attest:

ERNEST W. SWIDER　　　　　　　　　　　EDWARD J. BRENNER
Attesting Officer　　　　　　　　　　　Commissioner of Patents